Aug. 4, 1936.　　　　R. G. BOWER　　　　2,050,037
CASE SHIFT MECHANISM
Original Filed April 28, 1933　　3 Sheets—Sheet 1
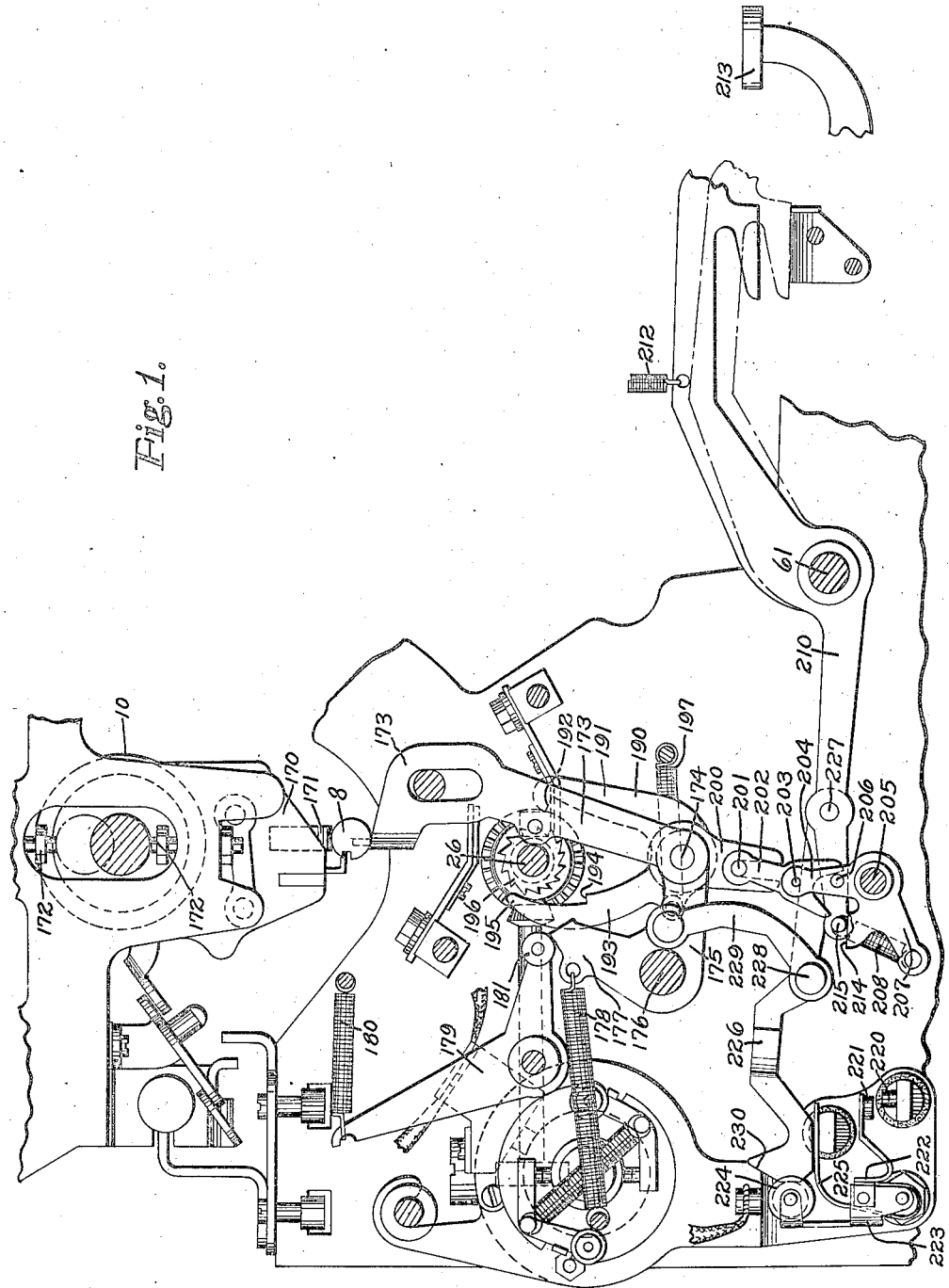
INVENTOR
Raymond G. Bower
BY
Rector, Hibben, Davis & Macauley
ATTORNEYS

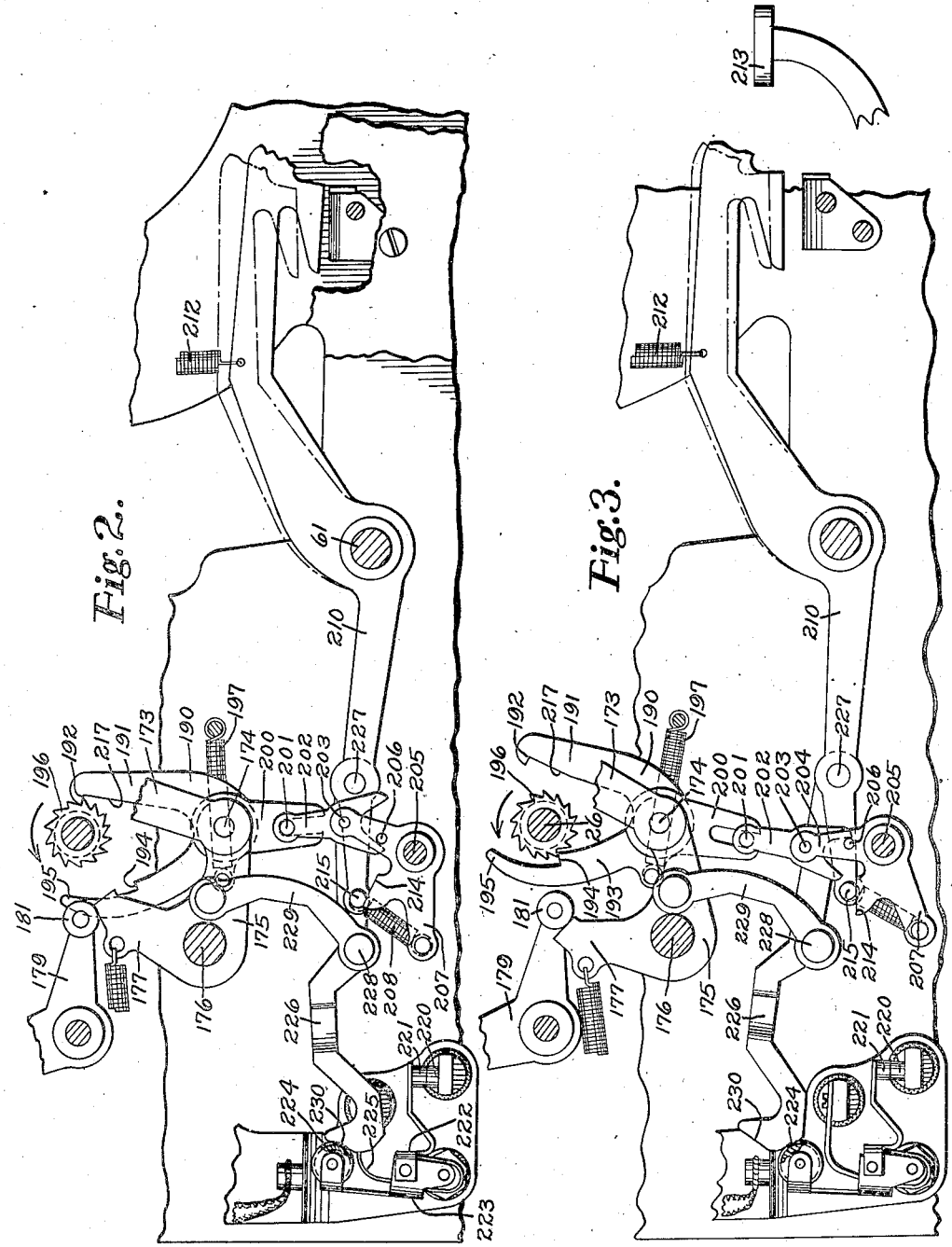

Patented Aug. 4, 1936

2,050,037

UNITED STATES PATENT OFFICE 2,050,037

CASE SHIFT MECHANISM

Raymond G. Bower, Detroit, Mich.

Original application April 28, 1933, Serial No. 668,347. Divided and this application March 19, 1934, Serial No. 716,265

7 Claims. (Cl. 197—73)

This invention relates to case shift mechanism for typewriters and the like and is a division of my copending application, Serial No. 668,347, filed April 28, 1933.

The general object of the invention is to provide an improved power operated case shift mechanism.

A more particular object is to provide a case shift mechanism that can be driven by a normally inactive motor.

Another object is to provide a case shift mechanism that is power driven in both directions, that is, from lower to upper case position and from upper to lower case position.

A further object is to provide an improved case shift mechanism in which the case shift connections are automatically disconnected and the motor stopped when the case shift operation has been completed.

Another object is to provide a case shift mechanism which is automatically connected for operation and the motor started by release of the case shift key.

Other objects and advantages of the invention will appear from the following specification and drawings.

An embodiment of the invention is shown in the accompanying drawings in which,

Figure 1 is a partial side elevation of the power case shift mechanism with the parts shown in normal or lower case position.

Fig. 2 is a partial left side elevation of the case shift mechanism showing the parts in the position they occupy with the case shift key partially depressed but before the platen has been raised to upper case position.

Fig. 3 is a partial left side elevation of the case shift mechanism with the parts in the position they occupy after the case shift key has moved a slight distance toward its normal position after having been released, the platen being in its upper case position.

Figure 4:
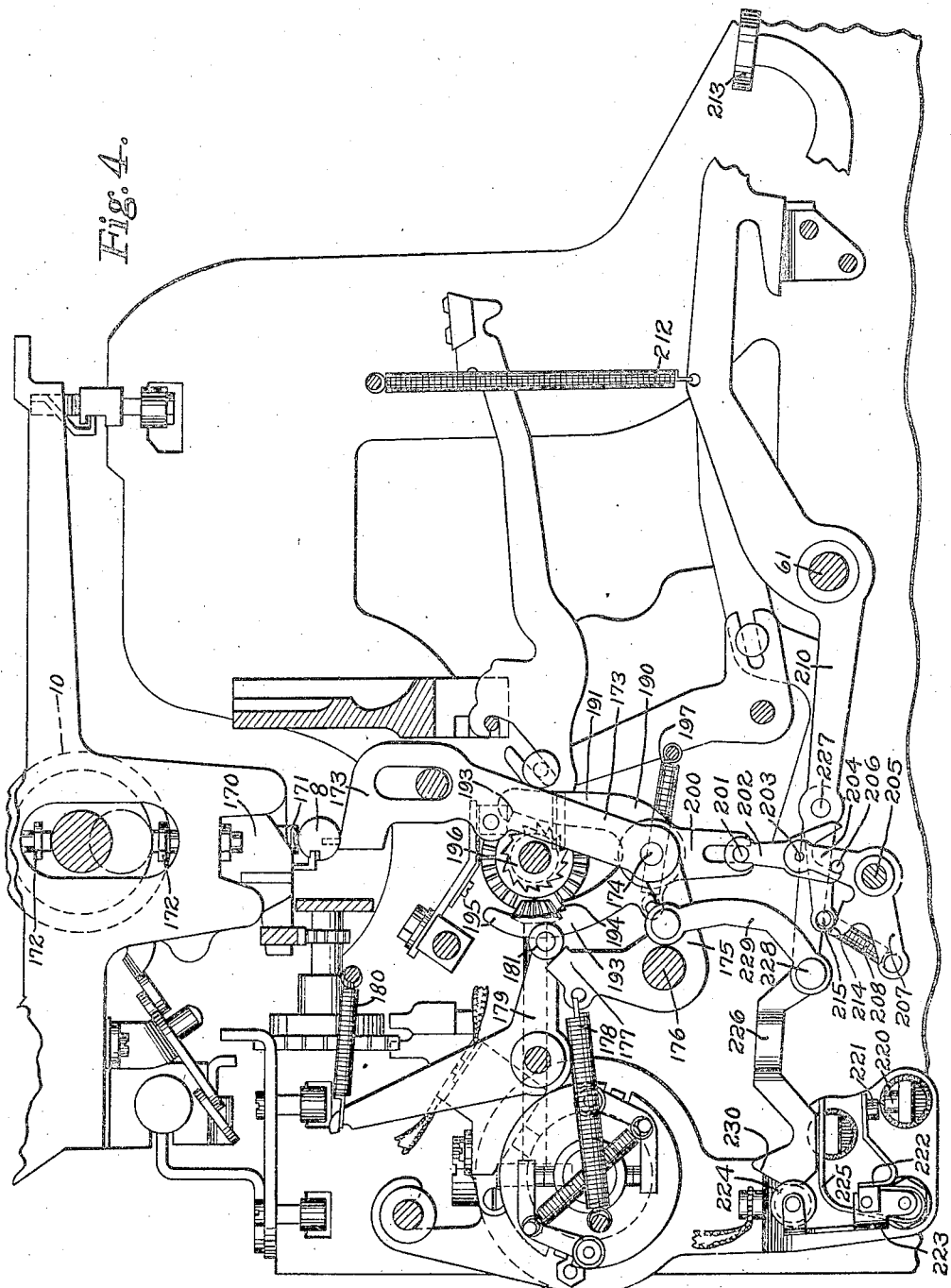
Fig. 4 is a view similar to Fig. 1 with the platen in its upper case position.

The machine is changed from one case shift position to another by power controlled by a case shift key, the arrangement being such that, when the case shift key is depressed, the motor is started and the case shift mechanism operated to shift the machine to upper case position after which the motor is stopped and the machine left in upper case condition as long as the shift key is held depressed. But, when the shift key is released, it operates to again start the motor and return the machine to its original case position.

Referring to Fig. 1, the platen 10 is supported in end pieces 170 and associated parts forming a platen carriage having rollers 171 traveling on the shiftable rail 8. The carriage is movable up and down between the adjustable stops 172 on the paper carriage side frames, there being stops on both sides of the paper carriage frame. The rail 8 is supported by vertically slidable links 173 of which there is one at each side of the machine. The lower ends of these links 173 are pivoted on studs 174 on the arms 175 of bell crank levers fixed to a shaft 176 that extends across the machine, there being a bell crank lever on each side of the machine. The other arms 177 of the bell crank levers have springs 178 connected to them which tend to balance the weight of the platen to maintain it in a floating condition. The upper ends of the arms 177 are spear pointed and spring pressed detents cooperate with these pointed ends to releasably hold the platen in the case shift position to which it is moved. These detents comprise bell crank levers 179 urged clockwise, as viewed in Fig. 1, by springs 180 and carrying rollers 181 engaging the spear pointed or cam ends of the arms 177.

When the platen is shifted to upper case position shown in Fig. 4, it is held in this position by the detents, in the manner there shown.

The links 173 supporting rail 8 are raised and lowered by power, as follows:

Pivoted on the stud 174 of the left-hand link 173 is a two arm pawl 190 having one arm 191 provided with a hooked nose 192 and another arm 193 provided with a shoulder 194 and a tail 195. Both the hooked nose and the shoulder 194 are adapted to engage the teeth of a toothed wheel 196 fixed to the shaft 26 that is rotated by the motor. The pawl 190 is urged clockwise in Fig. 1 by a spring 197, but when the spring passes below the center of stud 174, as shown in Fig. 4, the spring urges the pawl counterclockwise.

The lower end 200 of the pawl 190 has a slot in it which engages over a stud 201 on a Y-shaped member 202 which is pivoted at 203 to one arm 204 of a bell crank lever pivoted on a screw stud 205. The arm 204 carries a stud 206 positioned in the Y-shaped end of member 202. The other arm 207 of the bell crank lever is connected by a spring 208 to one end of a case shift key lever 210 pivoted at 61 and urged counterclockwise (Fig. 1) by a spring 212. The lever 210 carries a case shift key 213 (Fig. 4) on its front end. The bell crank lever 204—207 also has an abutment 214 adapted to engage a stud 215 on the end of the key lever 210.

When the machine is in lower case position, the parts normally occupy the position illustrated in Fig. 1. It will be observed that the hooked nose 192 of pawl arm 191 is out of the path of the teeth of wheel 196 and that the shoulder 194 of arm 193 is below the path of the teeth of said wheel. Accordingly, rotation of the toothed wheel will not normally affect the pawl 190.

When the case shift key 213 is depressed to move lever 210 from the full line to the dotted line position in Fig. 1, the bell crank lever 204—207 is swung clockwise. The pivot 203 causes the Y-shaped member to be swung counterclockwise until the left-hand arm, Fig. 1, of the Y-shaped member engages the stud 206, whereupon further rocking of the Y-shaped member is prevented and the continued clockwise rocking of bell crank 204—207 rocks the pawl 190 counterclockwise about stud 174 to the position of Fig. 2 where the nose 192 of the arm 191 comes into the path of the teeth of wheel 196. During the interval between the time that the right-hand arm of the Y-shaped member 202 disengages the stud 206 and the time that the left-hand arm of said Y-shaped member engages said stud 206, the spring 197 functions to prevent the nose 192 from prematurely engaging the ratchet wheel 196. This interval of time not only allows the motor to be started but enables the motor to reach its proper speed before a load is placed upon it as will hereinafter appear in more detail.

Assuming the ratchet wheel to be rotating, it then picks up the pawl 190 and carries it upward which rocks bell cranks 175—177 counterclockwise and moves links 173 upward to raise the platen to upper case position.

As the platen reaches upper case position, the nose 192 is raised above a point where it can continue in engagement with toothed wheel 196. A cam surface 217 on the edge of the pawl arm 191 engages the teeth and assists in throwing the nose 192 out of engagement with the teeth. Although the pawl arm 191 is disconnected from the toothed wheel, the platen remains in upper case position because it is releasably held by the detent 179.

As long as the case shift key is held depressed, the platen remains in upper case position.

When the case shift key is released, the key lever 210 is pulled upwardly from its full line position of Fig. 2 towards the dot and dash line position. As it moves upwardly, the bell crank lever 204—207 is rocked counterclockwise by the engagement of the stud 215 with the abutment 214. This swings the Y-shaped member 202 clockwise until it engages the stud 206 whereupon further rocking movement of the bell crank 204—207 serves to rock the pawl 190 clockwise to the position of Fig. 3, which places the shoulder 194 of the arm 193 in the path of the teeth of the ratchet wheel 196. The lost motion connection between the Y-shaped member 202 and the stud 206 enables the motor to be started and to gain proper speed before a load is placed upon it. The spring 197 functions to prevent premature engagement between the shoulder 194 and the ratchet wheel 196, the spring being in this case below the center of the stud 174. Assuming the ratchet to be rotating, it pushes the pawl arm 193 downward and the latter, in turn, rocks the bell cranks 175—177 clockwise to pull the links 173 downward. This lowers the rail 8 and the platen carriage from upper to lower case position. The arm 193 of pawl 190 moves downward until the tail 195 of the arm engages the ratchet wheel whereupon the shoulder 194 is thrown out of engagement with the ratchet wheel, as shown in Fig. 1. In the meantime, the spear point of the arm 177 has passed under the roller on spring detent 179 and the parts are then held in the position of Fig. 1.

Provision has also been made for starting and stopping the motor in connection with the case shift mechanism, as follows:

A switch is provided in the motor circuit comprising a stationary contact 220 and a movable contact 221 (Fig. 1), the latter being carried by a yoke 222. The yoke 222 is pivoted to another yoke 223 carrying a roller stud 224 on its upper end. A spring 225 urges yokes 222 and 223 in a direction tending to close the switch. But the switch is normally held open by an abutment lever 226 pivoted at its forward end at 227 on the case shift lever 210. The lever 226 is also pivoted at 228 to a link 229 pivoted at its upper end to the bell crank lever 175—177 (Fig. 1).

When the case shift key is depressed the case shift lever 210 is rocked clockwise (Fig. 1) and the abutment lever 226 is rocked counterclockwise on its pivot 228. This moves the abutment lever from the Fig. 1 position to the position of Fig. 2, where an inclined surface 230, on the end of lever 226, permits the roller 224 to move forward and the switch to close. Accordingly, when the case shift key is depressed, the motor switch is immediately closed to start the motor and the latter is given an interval of time in which to reach the desired speed after which the pawl 190 is moved so that the nose 192 on the pawl arm 191 comes into the path of the ratchet wheel. The motor is thus started and, after it reaches speed, the case shift mechanism is connected to it so as to move the platen automatically by power to upper case position.

As the platen moves toward upper case position, the bell crank 175—177 rocks counterclockwise and carries the link 229 upwardly. This rocks the abutment lever 226 clockwise about its pivot 227 on the case shift lever 210 until the abutment lever occupies the position of Fig. 4 where it will be observed the switch has been opened again. In other words, as the platen is raised to upper case position, the motor switch is automatically opened and the motor stops. As long as the case shift key is held depressed this condition obtains. It is to be observed that the opening of the switch depends upon the case shift position of the platen, that is, the bell crank 175—177 must reach its upper case position in order to open the switch.

When the case shift key is released, the case shift lever 210 is moved counterclockwise from its Fig. 4 position and as this occurs, the abutment lever 226 is rocked clockwise on its pivot 228 to the position of Fig. 3 which releases the switch and permits it to close again. The lost motion connection between the Y-shaped member 202 and the stud 206 again comes into action to allow the motor a period of time within which to reach proper speed. Accordingly, release of the case shift key starts the motor again and positions the pawl 190 so that the rotation of the ratchet wheel will move the platen from upper to lower case position.

As the platen moves to lower case position again, the bell crank 175—177 is rocked clockwise and the link 229 lowered, which swings the abutment lever 226 counterclockwise about its pivot 227 on the case shift lever 210. This returns the abutment lever to its Fig. 1 position and opens the switch to stop the motor. Here again, it is to be observed that the opening of the motor circuit depends upon the case shift position of the platen, that is, the bell crank 175—177 must reach a lower case position in order to open the switch.

From this it will be observed that the motor is caused to operate only long enough to shift the platen in either direction even though the shift key is held down.

It is also noted that connection between the parts 210, 202 and 200 is such that it enables the case shift key to be depressed a considerable distance without immediately causing the movement of the platen. In other words, a time element is provided which enables the motor to be started and then causes the platen to be shifted during the final portion of the downward key stroke of the case shift key.

It is understood that the structure shown in this application is for purposes of illustration only and that variations may be made in it without departing from the spirit and scope of the invention, as defined by the appended claims.

I claim:

1. A typewriter having a platen and a plurality of type bars, a member movable to change said typewriter from lower to upper case position and vice versa, power means for moving said member including a normally inactive electric motor and a depressible case shift key and connections urged to a normal position but movable therefrom, said case shift key and connections being operable, upon depression of said key, to start said motor and cause said power means to move said member from lower to upper case position, and control means automatically stopping said motor when said member reaches upper case position, said case shift key and connections being operable, upon release of said key, to again start said motor and cause said power means to move said member from upper to lower case position.

2. A typewriter having a platen and a plurality of type bars, a member movable to change said typewriter from lower to upper case position and vice versa, a normally inactive motor having a disengageable driving connection with said member, a depressible case shift key and connections urged to a normal position, said case shift key and connections being operable, upon depression of said key to start said motor and engage said driving connection to cause said member to be moved from lower to upper case position, and control means acting to automatically stop said motor and disengage said driving connection when said member reaches upper case position while said key remains depressed, said case shift key and connections being operable, upon release of said key, to engage said driving connection and condition said control means to start said motor to thereby move said member from upper to lower case position.

3. A typewriter having a platen and a plurality of type bars, a member movable to change said typewriter from lower to upper case position and vice versa, power means including an electric motor for moving said member, a switch for said motor, a link pivotally connected to said member, an abutment lever pivoted near its center to said link and normally holding said switch open, and a case shift lever pivoted to one end of said lever whereby when said case shift lever is moved in one direction, said abutment lever is swung about its pivot to said link to cause said switch to be closed and whereby, as said member is moved to upper case position, said link moves said abutment lever about its pivot with the case shift lever to open said switch, and whereby, when said case shift lever is moved in the opposite direction, said abutment lever is swung about its pivot to said link in the opposite direction to its first movement to cause said switch to be closed, and whereby, as said member is moving to lower case position, said abutment lever is moved about its pivot with the case shift lever to again open the switch.

4. A typewriter having a platen and a plurality of type bars, a member movable to change the typewriter from lower to upper case position and vice versa, a normally inactive electric motor for moving said member, normally disconnected connecting means between said motor and said case shift member, a case shift key having means associated with it operable to start said motor, a lost motion connection between said case shift key and said connecting means whereby, when said case shift key is depressed, said motor is started and said connecting means subsequently connected so as to move said case shift member, and means operable to automatically stop said motor as said case shift member reaches upper case position.

5. A typewriter having a platen and a plurality of type bars, a member movable to change said typewriter from lower to upper case position and vice versa, a normally inactive electric motor for moving said member, a depressible case shift key urged to a normal position but movable therefrom, means operable upon depression of said key to start said motor and cause it to move said case shift member from lower to upper case position, said case shift key and associated means being operable, upon release of said key, to start said motor and to subsequently connect said motor to said case shift member to move said member from upper to lower case position, and means acting to automatically stop said motor as said case shift member reaches lower case position.

6. A typewriter having a platen and a plurality of type bars, a member movable to change said typewriter from lower to upper case position and vice versa, driving means for moving said member including a normally inactive electric motor, a depressible case shift key and connections urged to a normal position but movable therefrom, said case shift key and connections being operable, upon depression of said key, to first start said motor and to subsequently connect said driving means to said case shift member to cause the latter to be moved from lower to upper case position, control means automatically stopping said motor when said case shift member reaches upper case position, said case shift key and connections being operable, upon release of said key, to first start said motor and to subsequently connect said power means to said case shift member to move the latter from upper to lower case position, said control means acting to stop said motor as said case shift member reaches lower case position.

7. A typewriter having a platen and a plurality of type bars, a member movable to change said typewriter from lower to upper case position and vice versa, driving means for moving said member including a normally inactive electric motor, normally disconnected connecting means between said motor and said case shift member, a depressible case shift key having means associated with it operable to start said motor upon depression of said key and having a lost motion connection with said connecting means whereby, upon depression of said case shift key, said motor is first started and said driving means is subsequently connected to said case shift member, control means operable to stop said motor and disconnect said connecting means as said member reaches upper case position, said case shift key and associated means and connections being operable, upon release of said key, to first start said motor and, through said lost-motion connection to subsequently connect said motor to said case shift member, said control means operating to stop said motor and disconnect said connecting means as said case shift member reaches lower case position.

RAYMOND G. BOWER.